United States Patent
Fernandez

(10) Patent No.: US 11,046,461 B2
(45) Date of Patent: Jun. 29, 2021

(54) METHOD FOR REPAIRING DELAMINATION AND MOISTURE BY HEAT, PRESSURE AND ADHESIVE

(71) Applicant: Rangel Fernandez, Doral, FL (US)

(72) Inventor: Rangel Fernandez, Doral, FL (US)

( * ) Notice: Subject to any disclaimer, the term of this patent is extended or adjusted under 35 U.S.C. 154(b) by 62 days.

(21) Appl. No.: 16/536,001

(22) Filed: Aug. 8, 2019

(65) Prior Publication Data
US 2020/0047921 A1  Feb. 13, 2020

Related U.S. Application Data

(60) Provisional application No. 62/715,968, filed on Aug. 8, 2018.

(51) Int. Cl.
*B64F 5/40*  (2017.01)
*B29C 73/02*  (2006.01)
(Continued)

(52) U.S. Cl.
CPC .............. *B64F 5/40* (2017.01); *B29C 73/025* (2013.01); *B32B 7/12* (2013.01); *B32B 17/10963* (2013.01); *B32B 37/1284* (2013.01); *B32B 38/164* (2013.01); *B29C 65/524* (2013.01); *B29C 65/542* (2013.01);
(Continued)

(58) Field of Classification Search
CPC ......... B64F 5/40; B64C 1/1492; B29C 65/00; B29C 65/48; B29C 65/52; B29C 65/524; B29C 65/54; B29C 65/542; B29C 66/00; B29C 66/40; B29C 66/41; B29C 66/43; B29C 66/242; B29C 70/44; B29C 73/00; B29C 73/02; B29C 73/025; B29C 73/32; B29C 65/544; B29C 66/00145; B29C 66/342; B29C 66/45; B29C 66/87; B29C 70/443; B29C 73/166; B32B 7/12; B32B 17/10963; B32B 37/1284; B32B 38/164; B32B 2038/166; B32B 2605/18
USPC ..... 156/60, 94, 99, 103, 104, 106, 107, 109, 156/145, 146, 147, 156, 285, 286, 287, 156/292, 305; 425/11, 12, 13; 52/204.6; 428/34; 264/36.1, 36.15
See application file for complete search history.

(56) References Cited

U.S. PATENT DOCUMENTS 4,780,162 A   10/1988  Forler et al.
4,952,257 A *  8/1990  Forler ............... B32B 17/10036
                                                  156/94
(Continued)

*Primary Examiner* — Philip C Tucker
*Assistant Examiner* — Brian R Slawski
(74) *Attorney, Agent, or Firm* — Malloy & Malloy, P.L.; Robert M. Downey

(57) ABSTRACT

A method for repairing aircraft window laminates in which two plies have become separated to create a void, and wherein moisture may have entered through an edge of the window laminate and into the void. The method includes the steps of: placing the window laminate in a vacuum bag and inserting the vacuum bag containing the window laminate into an oven or autoclave for a minimum of ten minutes at a minimum temperature of 120 degrees Fahrenheit to remove the moisture between the plies; removing the vacuum bag and window laminate from the oven, and removing the window from the vacuum bag; forcing a needle on a syringe through the edge of the window laminate in the area of the void; and injecting an adhesive in the syringe into the void to fill the void with the adhesive.

2 Claims, 1 Drawing Sheet

(51) Int. Cl.
  *B32B 38/00* (2006.01)
  *B32B 7/12* (2006.01)
  *B32B 17/10* (2006.01)
  *B32B 37/12* (2006.01)
  *B32B 38/16* (2006.01)
  *B29C 65/52* (2006.01)
  *B29C 65/54* (2006.01)
  *B29C 65/00* (2006.01)
  *B29C 73/32* (2006.01)

(52) U.S. Cl.
  CPC ............ *B29C 66/342* (2013.01); *B29C 66/43* (2013.01); *B29C 66/45* (2013.01); *B29C 73/32* (2013.01); *B32B 2038/166* (2013.01); *B32B 2605/18* (2013.01)

(56) References Cited

U.S. PATENT DOCUMENTS

| | | | | |
|---|---|---|---|---|
| 5,049,217 | A * | 9/1991 | Forler | B32B 17/10036 156/64 |
| 5,405,468 | A * | 4/1995 | Olson | B32B 17/10036 156/101 |
| 5,506,057 | A * | 4/1996 | Olson | B32B 17/10 156/102 |
| 6,804,924 | B2 * | 10/2004 | Zurn | E06B 3/677 52/204.52 |
| 6,916,392 | B2 * | 7/2005 | Trpkovski | B23B 49/005 141/59 |
| 2018/0313100 | A1 * | 11/2018 | Borys | E06B 3/6715 |

* cited by examiner

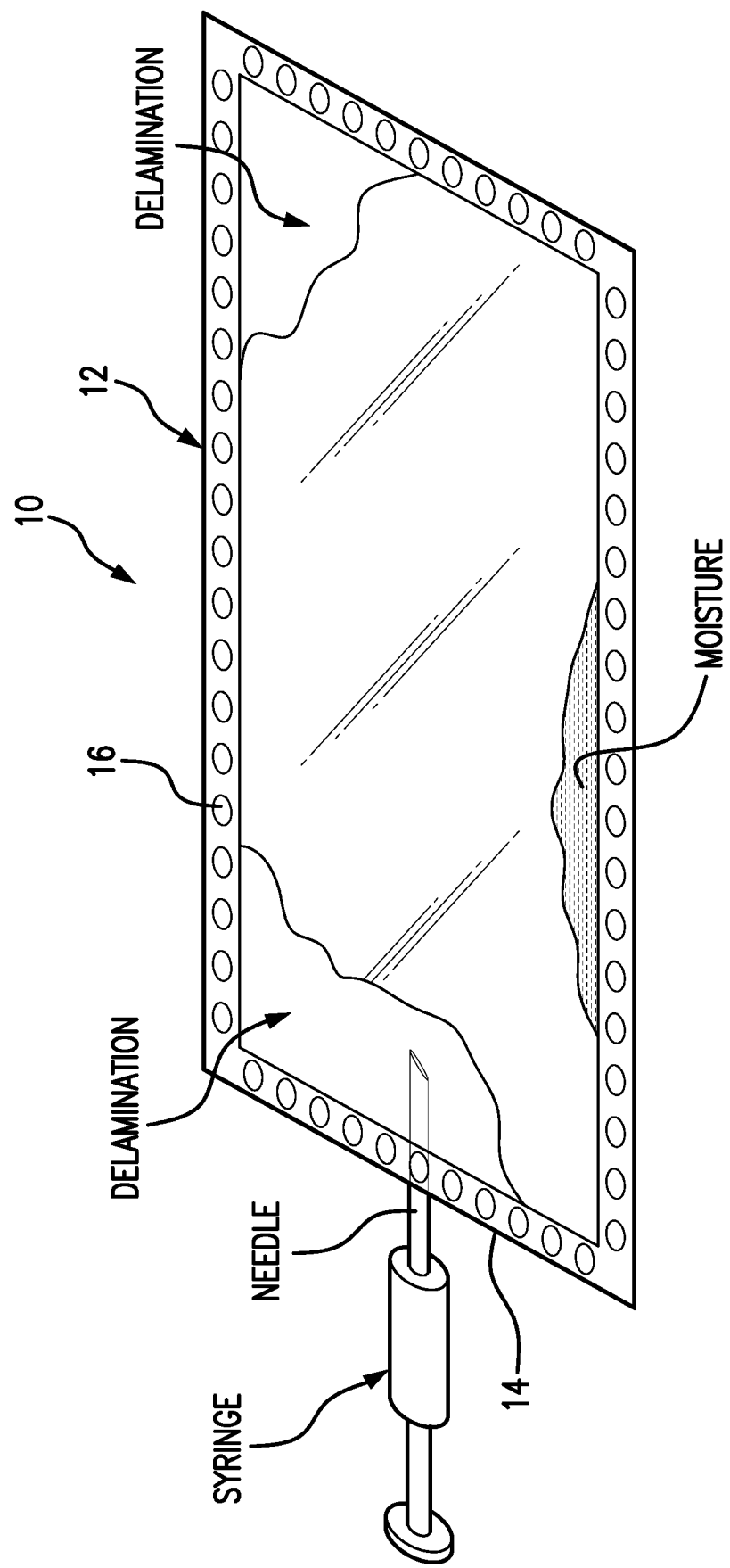

METHOD FOR REPAIRING DELAMINATION AND MOISTURE BY HEAT, PRESSURE AND ADHESIVE

This patent application is based on provisional patent application Ser. No. 62/715,968 filed on Aug. 8, 2018.

BACKGROUND OF THE INVENTION

Field of the Invention

The invention relates to a method for repairing a delaminated aircraft windshield in which two plies of the laminate have been delaminated and or wherein moisture has entered through an edge of the window laminate structure causing the windshield to become non-airworthy or rejected.

Discussion of the Related Art

Aircraft window laminates typically comprise two to five plies of glass and/or acrylic material which are bound together by interposed polyvinyl adhesive plies. One particular disadvantage of window laminates of this nature is their tendency to delaminate under certain conditions or after a certain length of time. Upon delamination, the desired characteristics of the laminate (strength, durability, light transmittance characteristics, etc.) are substantially and adversely effected. Further, once this delamination occurs, the delamination spreads rather rapidly throughout the entire window laminate structure. A further problem occurs when moisture enters through the edge of the window laminate structure at the areas of delamination and into the void created by delamination of the two plies. Naturally, it is undesirable to have moisture between plies in a window laminate structure, as this will result in fogging and severely diminished transparency of the window, as well as a degradation of the structural integrity of the window laminate structure.

Methods for repairing delamination of aircraft window laminate structures are disclosed in U.S. Pat. No. 4,780,162 to Forler et al. and U.S. Pat. No. 5,049,217 to Forler, the contents of which are incorporated herein by reference.

SUMMARY OF THE INVENTION

The method includes placing the aircraft window laminate in a vacuum bag and inserting it into an oven or autoclave for a specific ramp up/hold and ramp down, depending on the severity of the delamination or moisture presented.

Subsequently, a syringe is filled with adhesive. The syringe is affixed to a hypodermic needle and the needle is forced into the void or edge of aircraft window laminate at the delaminated area. The adhesive is injected into the delaminated area to fill the void between plies and prevent moisture or delamination from returning.

Objects and Advantages of the Present Invention

Considering the forgoing, it is a primary object of the present invention to provide a method for repairing aircraft window laminate structures which can be performed at a cost substantially less than the original cost of the aircraft window laminate.

It is a further object of the present invention to provide a method for effectively removing moisture from within voids created by delamination of an aircraft window laminate structure.

These and other objects and advantages of the present invention are more readily apparent with reference to the following detailed description taken in conjunction with the accompanying drawings.

BRIEF DESCRIPTION OF THE DRAWING

For a fuller understanding of the nature of the present invention, reference should be made to the following detailed description taken in conjunction with the accompanying drawing in which:

FIG. 1 is a perspective view of an aircraft window illustrating the manner in which the syringe and hypodermic needle is inserted through the seal member into the void of the plies of the laminate which have become separated.

Like reference numerals refer to like parts throughout the several views of the drawings.

DETAILED DESCRIPTION OF THE PREFERRED EMBODIMENT

Referring to FIG. 1, a typical aircraft window 10 comprises a transparent laminate structure 12 having several glass and/or acrylic plies adhered together by means of interposed adhesive plies. A frame structure 16 is secured about a perimeter of the window 12 to secure the laminate plies. In particular, the frame structure holds a peripheral edge 14 of the two or more plies of the window laminate structure 12 tightly together.

As noted above, one particular problem encountered with aircraft window laminates, of the type shown in FIG. 1, is the tendency of the two or more plies to delaminate. Upon delamination, voids are created between the two or more plies. Sometimes, moisture can enter through the edge 14 of the window laminate structure 12 to fill the voids created by delamination.

The present invention provides a method for removing moisture within the voids of delaminated aircraft window laminate structures and further a method for repairing the delaminated areas. The method for removing moisture includes the steps of: placing the aircraft window laminate structure in a vacuum bag and sealing the vacuum bag closed; inserting the vacuum bag containing the window laminate into an oven or autoclave for a minimum of ten minutes at a minimum temperature of 120 degrees Fahrenheit to remove the moisture between the two or more plies of the delaminated aircraft window laminate structure; removing the vacuum bag and the window laminate structure from the oven or autoclave; and removing the window from the vacuum bag. The method further includes the steps of repairing the delaminated areas by forcing a needle on a syringe through the edge 14 of the aircraft window laminate structure 12 in the area of delamination and injecting an adhesive in the syringe into the void to fill the void with the adhesive; and removing the needle from the void and from the edge of the aircraft window laminate structure.

What is claimed is:

1. A method for repairing an aircraft window laminate which has been delaminated and wherein moisture has entered into a void created by delamination, comprising the steps of:
   placing the aircraft window laminate into a vacuum bag, sealing the vacuum bag closed and placing the vacuum bag containing the aircraft window laminate into an oven or an autoclave for a minimum of ten minutes at a minimum temperature of 120 degrees Fahrenheit to remove moisture between plies of the aircraft window laminate; and removing the vacuum bag and the aircraft window laminate from the oven or the autoclave; and removing the aircraft window laminate from the vacuum bag.

2. The method for repairing an aircraft window laminate, as recited in claim 1 further comprising the steps of:

forcing a needle on a syringe through an edge of the aircraft window laminate in an area of delamination so that the needle enters into the void created by delamination; and injecting an adhesive in the syringe into the void to fill the void with the adhesive.

\* \* \* \* \*